Dec. 14, 1926.
H. G. KELLOGG
1,610,860
MACHINE FOR FORMING WINDOW GLASS CHANNELS
Filed Dec. 17, 1923    4 Sheets-Sheet 1
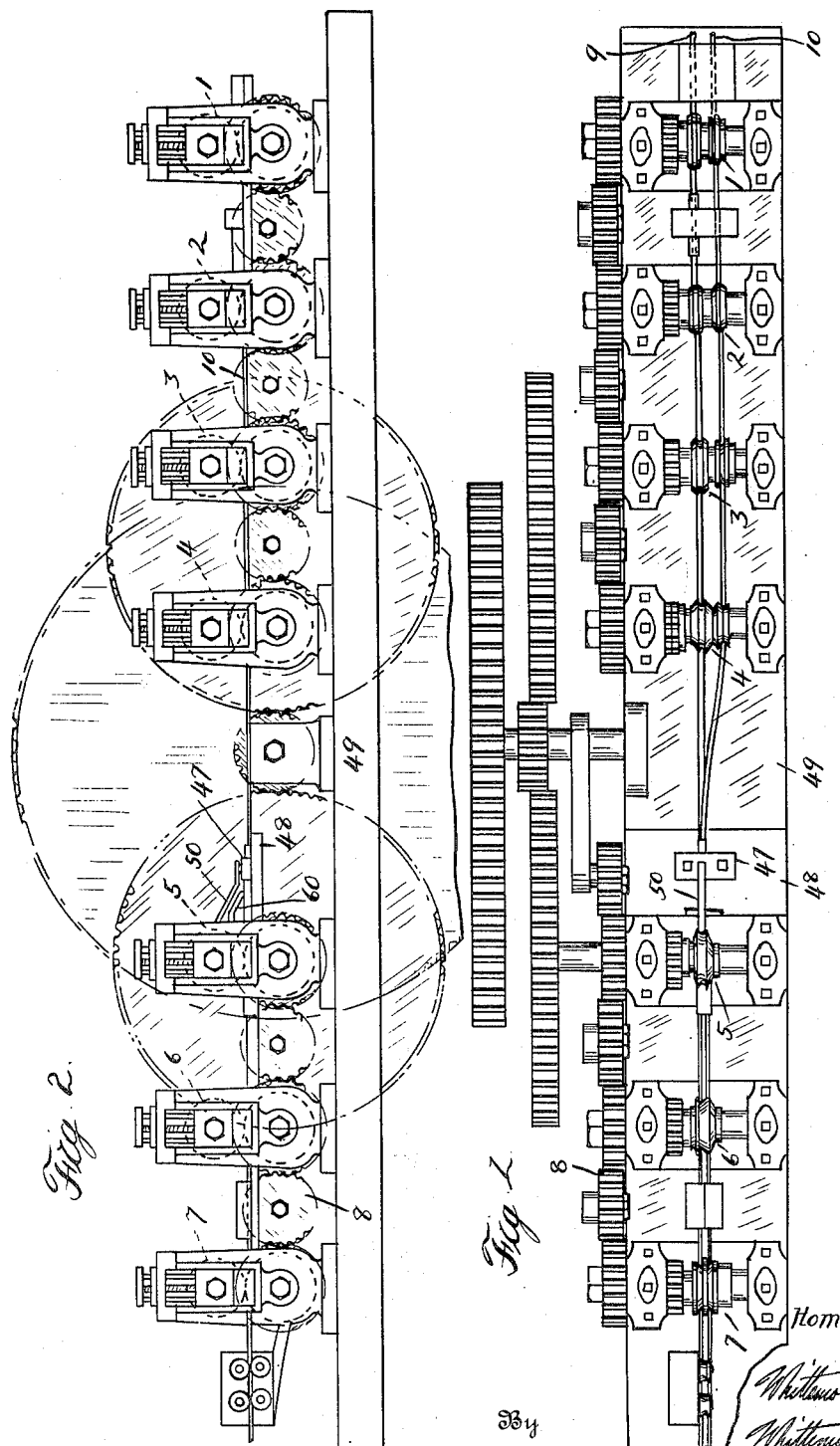

Dec. 14, 1926.
H. G. KELLOGG
1,610,860
MACHINE FOR FORMING WINDOW GLASS CHANNELS
Filed Dec. 17, 1923    4 Sheets-Sheet 2
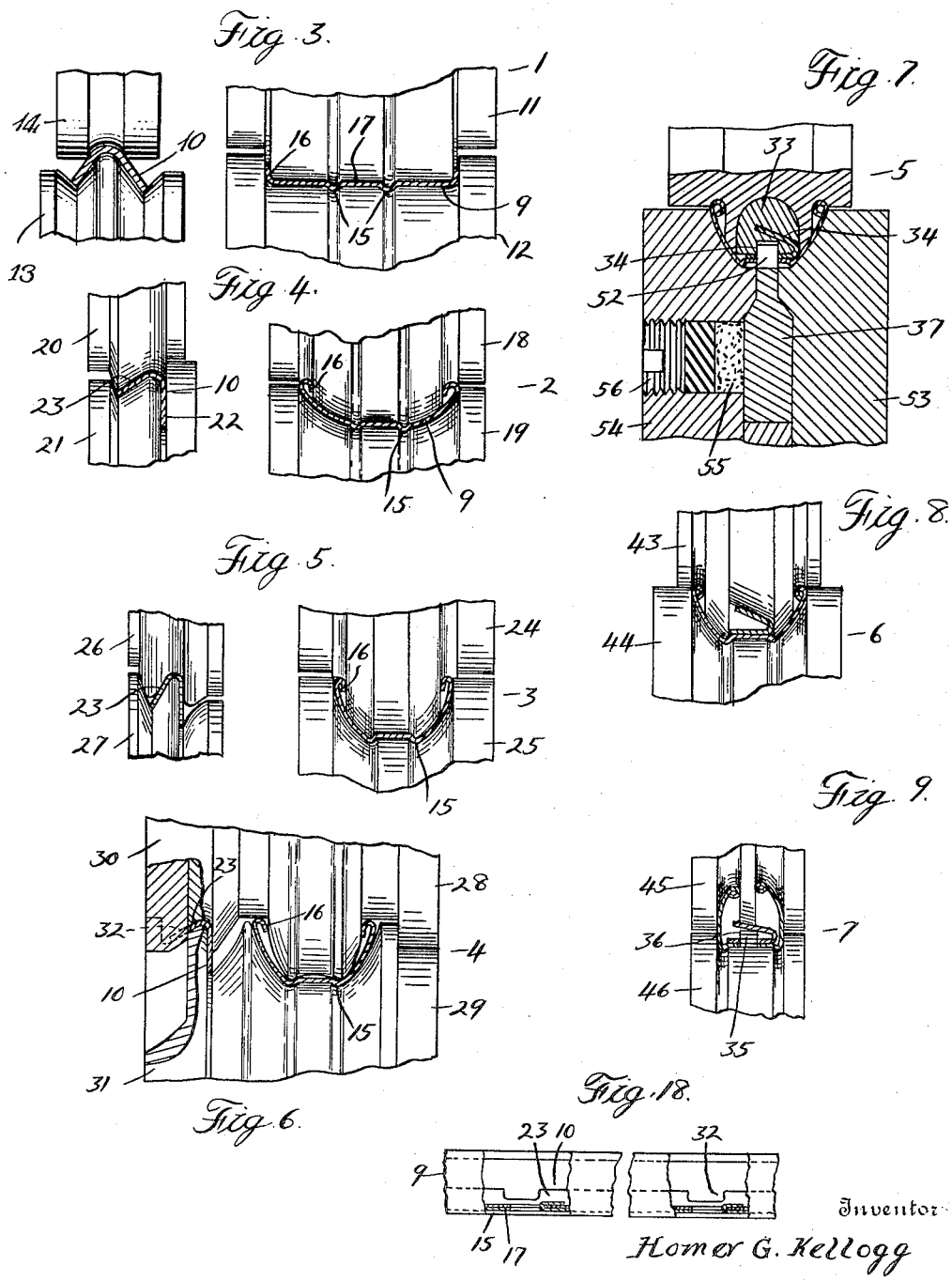
Inventor
Homer G. Kellogg
Attorneys Dec. 14, 1926.
H. G. KELLOGG
1,610,860
MACHINE FOR FORMING WINDOW GLASS CHANNELS
Filed Dec. 17, 1923   4 Sheets-Sheet 3
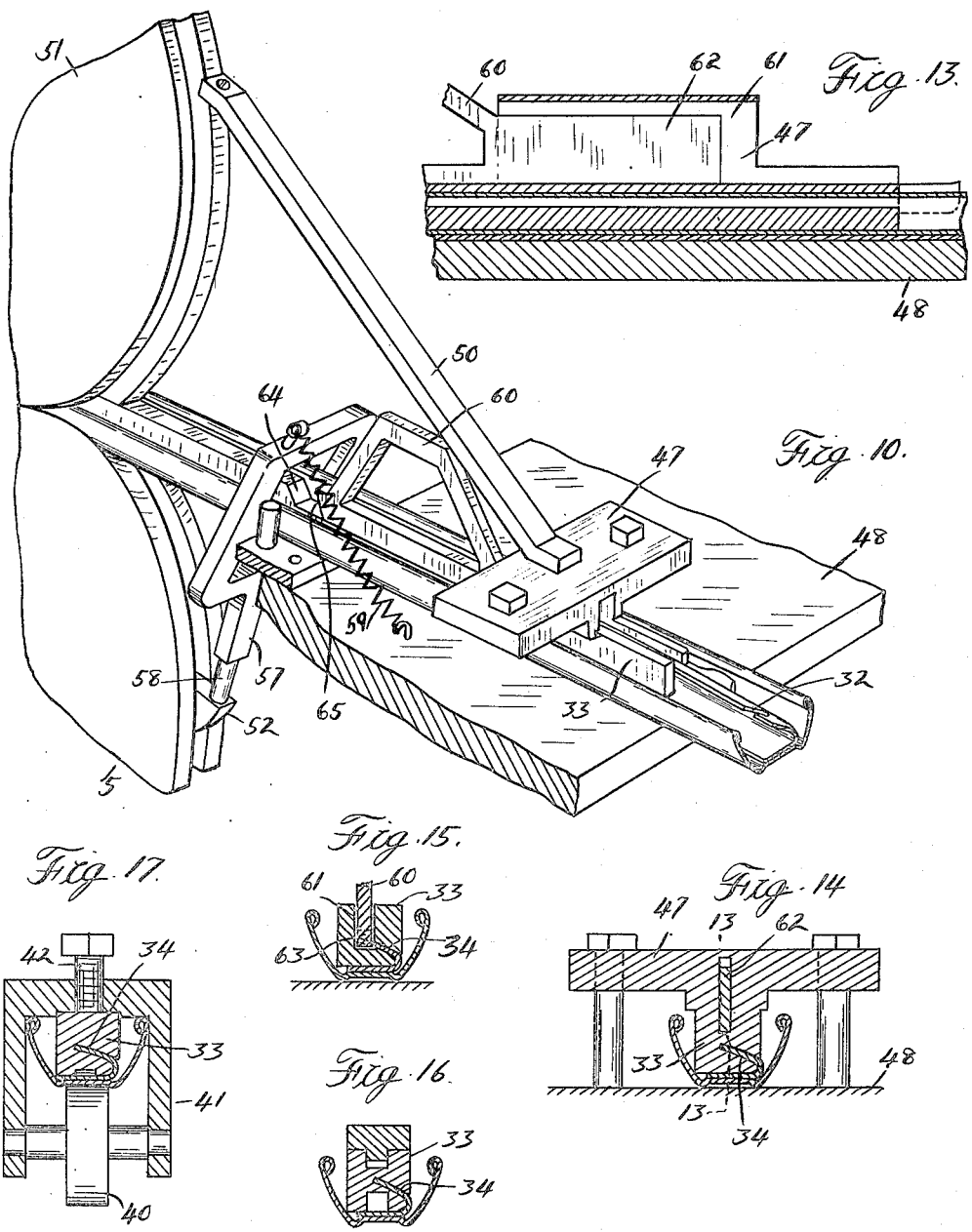

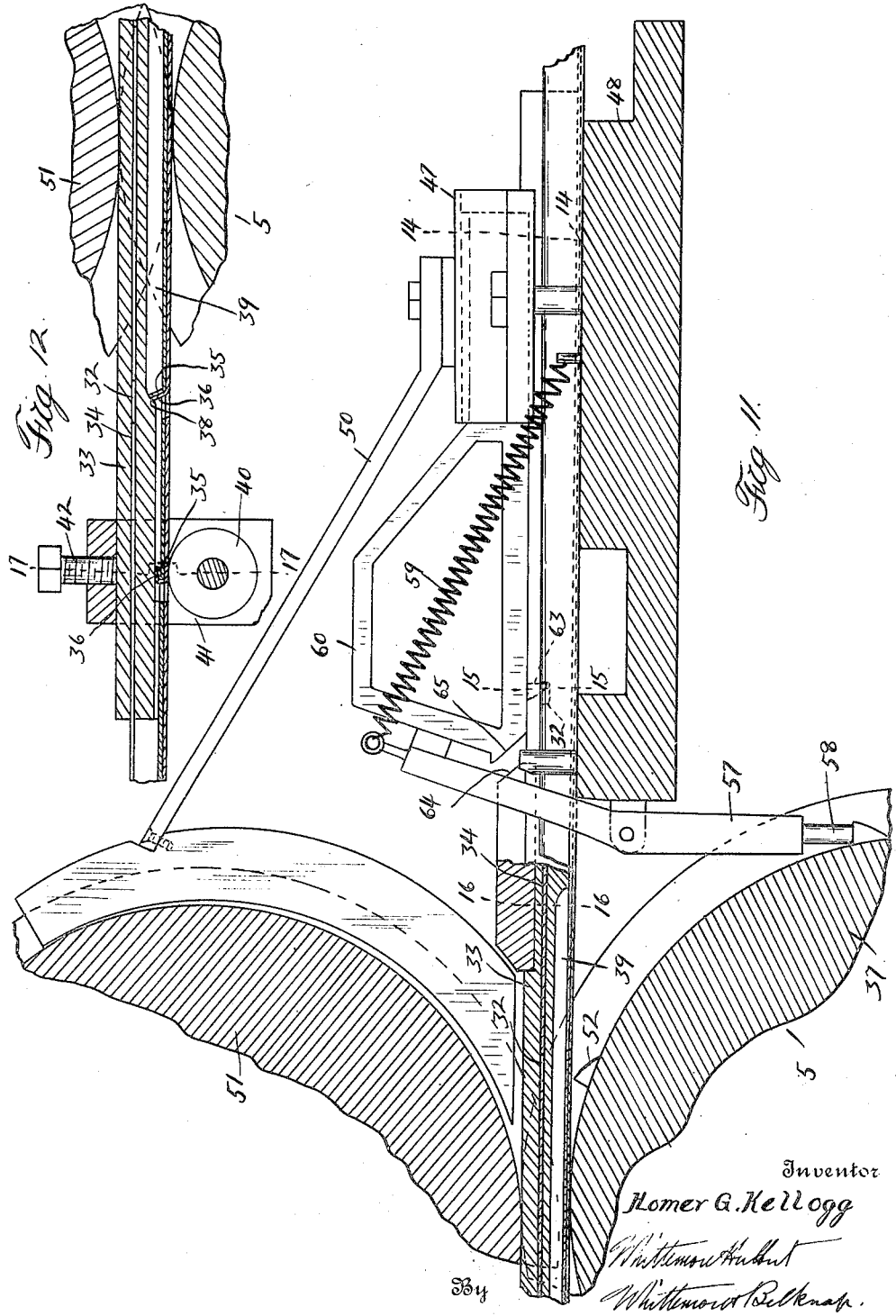

Patented Dec. 14, 1926.

1,610,860

UNITED STATES PATENT OFFICE.

HOMER G. KELLOGG, OF DETROIT, MICHIGAN, ASSIGNOR TO MOTOR PRODUCTS CORPORATION, OF DETROIT, MICHIGAN, A CORPORATION OF NEW YORK.

MACHINE FOR FORMING WINDOW-GLASS CHANNELS.

Application filed December 17, 1923. Serial No. 681,300.

The invention relates to machines for forming channels and particularly window glass channels consisting of an outer strip and an inner strip within the outer strip.

The invention has for one of its objects the provision of a machine which, during the advancement of a pair of metallic strips, fashions the same and also nests one strip within the other. Another object is to provide a machine which also secures the strips to each other during their advancement. A further object is the provision of means which operates intermittently to secure the strips to each other.

With these as well as other objects in view, the invention resides in the novel features of construction and combinations and arrangements of parts as more fully hereinafter set forth.

In the drawings:

Figure 1 is a plan view of the machine embodying my invention;

Fig. 2 is a side elevation thereof;

Figs. 3, 4, 5, 6, 7, 8, and 9 are sections through portions of the successive sets of rolls from front to rear of the machine;

Fig. 10 is a perspective view of the device for securing the strips to each other;

Figs. 11 and 12 are longitudinal sectional elevations of the front and rear portions thereof;

Fig. 13 is a longitudinal cross section through part of the front portion thereof;

Figs. 14, 15 and 16 are cross sections on the lines 14—14, 15—15, and 16—16 of Fig. 11;

Fig. 17 is a cross section on the line 17—17 of Fig. 12;

Fig. 18 is a side elevation partly in section, of a portion of the window glass channel formed in the machine.

In general, the machine for forming the window glass channel comprises a series of sets of driven rolls which advance a pair of flat metallic strips or ribbons, and during their advancement fashion the same, nest one within the other, and secure the same to each other. The machine comprises the sets of rolls 1, 2, 3, 4, 5, 6, and 7 all of which are driven in timed relation to each other through the series of intermeshing gears 8 extending longitudinally of the machine and at one side thereof.

The sets of rolls 1, 2, 3 and 4 each comprise two pairs of cooperating upper and lower rolls, corresponding pairs of which successively operate upon metallic strips 9 and 10 which are advanced from reels in advance of the machine. The set of rolls 1 comprises the pair of upper and lower cooperating rolls 11 and 12 and the pair of upper and lower cooperating rolls 13 and 14, the first pair operating upon the flat metallic strip 9, and the second pair operating upon the flat metallic strip 10. The first pair of rolls changes the contour of the strip 9 by forming the longitudinally extending beads 15 near its middle portion and by upturning the edge portions 16. The portion 17 of the strip intermediate the beads 15 forms the base of the completed strip. The second pair of rolls 13 and 14 operate upon the strip 10 to form portions diverging upwardly from its middle.

The set of rolls 2 comprises the pair of upper and lower cooperating rolls 18 and 19 which operate upon the strip 9 after it has left the pair of cooperating rolls 11 and 12 to concave the same upwardly and at the same time to return-bend the edge portions 16. This second set of rolls 2 also comprises the pair of upper and lower cooperating rolls 20 and 21 for operating upon the strip 10 after leaving the first pair of rolls 13 and 14. The rolls 20 and 21 bend the strip to form the downwardly extending portion 22 and the laterally and downwardly inclined portion 23, the portion 22 forming the base of the completed strip.

The set of rolls 3 comprises the pairs of upper and lower cooperating rolls 24 and 25 which operate upon the strip 9 after leaving the set of rolls 18 and 19 to bend the portions of the strip outside of the beads 15 still further upwardly and at the same time to bend the flanged edges 16 still further downwardly. The set of rolls 3 also comprises the pair of upper and lower cooperating rolls 26 and 27 which operate upon the strip 10 after it leaves the pair of rolls 20 and 21 and bend the lateral downwardly inclined portion 23 of the strip downwardly to a greater extent.

The set of rolls 4 comprises the pair of upper and lower cooperating rolls 28 and 29 which operate upon the strip 9 after leaving the pair of rolls 24 and 25 and bend the portions of the strip outside of the beads 15 further upwardly. This set also comprises the pair of upper and lower cooperating rolls 30 and 31 which operate upon the strip 10 after leaving the pair of rolls 26 and 27 to cut out portions of the lateral downwardly inclined portion 23 of the strip, leaving open-ended notches 32 longitudinally spaced along the strip.

The strips 9 and 10 upon leaving the set of rolls 4 are converged and the strip 10 is rotated through an angle of 90° and nested within the strip 9 with its base 22 adjacent to and above the base 17 of the strip 9. 33 is a mandrel for guiding the strips 9 and 10 with the bases of the strips adjacent to and below the mandrel. The strip 9 embraces the mandrel while the notched portion 23 of the strip 10 slidably engages in the inclined slot 34 extending longitudinally of the mandrel while the strips are passing at the same rate along the mandrel. The bases 22 and 17 thereof have tongues 35 and 36 struck upwardly therefrom by means of the shearing roll 37 which forms a part of the set of rolls 5. Upon continued advancement of the strips, the struck-up tongues 35 and 36 are bent back upon the bases of the strips by means of the shoulder 38 in rear of the set of rolls 5 and forming the rear end of the slot 39 extending longitudinally at the bottom of the mandrel 33. This slot is necessary to permit of striking the tongues upwardly from the base of the strips. To crimp the tongues 35 and 36 upon the bases of the strips I have provided the roll 40 mounted in the yoke 41 below the bases of the strips and held tightly thereagainst by means of the set screw 42 engaging the top of the yoke and abutting against the top of the mandrel 33.

Upon leaving the mandrel, the strips pass successively through the sets of rolls 6 and 7 comprising respectively the pair of cooperating upper and lower rolls 43 and 44 and the pair of cooperating upper and lower rolls 45 and 46 which operate upon both the strips 9 and 10 to fashion the same to the desired final form.

The mandrel 33 is held in place by means of the block 47 in advance of the set of rolls 5 and preferably integral with the mandrel, this block being bolted to the table 48 above the bed plate 49 of the machine. To hold the mandrel from rotation, I have provided the upwardly and rearwardly extending arm 50 secured to the block 47 and engaging in the annular groove formed in the upper roll 51 of the set of rolls 5, this groove permitting of the passage of the mandrel 33 between itself and the lower roll of the set.

It is essential that the tongues 35 and 36 struck upwardly from the bases of the strips 9 and 10 respectively be so located that the openings in the bases formed by striking up the tongues register with the notches 32 in the lateral inclined portion 23 of the strip 10 so that means for securing the completed window glass channel to the frame may be readily inserted through the notches 32 and extend through the openings in the bases. The striking-up of the tongues is accomplished by shearing projections or teeth 52 upon the shearing roll 37 and equally spaced about its periphery, and the controlling of the operation of the shearing roll is accomplished by mechanism operated by the advancement of the strips. As shown particularly in Fig. 7, the shearing roll 37 is frictionally driven, it being located between the sections 53 and 54 forming the lower roll of the set of rolls 5. 55 is a driving member formed of suitable material such as leather which is held against one side of the shearing roll 37 by means of the set screw 56 threaded in the section 54. To hold the shearing roll 37 from rotation, I have provided the yoke 57 pivotally mounted upon the table 48 and having the depending projection 58 engageable with a shearing projection or tooth 52. This yoke embraces the mandrel 33 and is yieldably held so that its depending projection 58 will be in the path of the shearing projection or tooth by means of the coil spring 59 connected to the upper end of the yoke and to the table 48. To actuate the yoke 57 and release the shearing roll 37, I have provided the release member 60 which slidably engages in a longitudinally extending slot 61 in the top of the mandrel and has a stem 62 slidably engaging in the block 47. This release member is provided with the depending projection 63 which is adapted to engage in the notches 32 by gravity so that upon the advancement of the strips the release member will also be advanced. The advancement of the release member is continued until its rear end has engaged the yoke 57 to swing the same until its depending projection 58 becomes disengaged from the shearing projection or tooth 52. Then the depending projection 63 of the release member is disengaged from the notch in the strip 10 by means of the cam 64 upon the mandrel which is engaged by the inclined face 65 upon the release member. The location of the parts is such and the rate of rotation of the shearing roll and rate of advancement of the strips also is such that when the shearing roll has been released, one of its shearing projections or teeth will strike up the tongues in the bases of the strips so that the opening formed by striking-up the tongues will register with a notch in the strip 10. Upon disengagement of the release member 60 from the strip 10, the yoke 57 is returned by the coil spring 59 to its normal position with its depending projection 58 adapted to engage the succeeding shearing projection or tooth 58 of the shearing roll 37. This yoke returns the release member to its normal position disengaging the same from the cam 64 and allowing its depending projection 63 to drop into the succeeding notch 32 of the strip 10, after which the same cycle of operations is repeated.

While I have used the term "channel" throughout the description, the invention in its broader aspects is not limited to a machine for forming an article having a strip of true channel cross section, but applies to a machine for forming a shape or molding having nested strips neither of which are necessarily of true channel cross section.

From the above description, it will be readily seen that I have provided a machine for forming a window glass channel, shape or molding comprising a pair of nested strips in which a pair of flat metallic strips or ribbons are continuously advanced and during their advancement are fashioned or nested and secured to each other so that the completed product is a window glass channel of indeterminate length which can be subsequently cut to desired lengths. It will also be seen that I have provided means controlling the intermittent driving of the device for shearing the securing tongues of the strips whereby the tongues will be struck-out to form openings registering with previously formed notches in the inner strip so that the completed window glass channel may be readily secured where desired.

What I claim as my invention is:

1. In a machine for forming channels, shapes or moldings, the combination of means for separately fashioning substantially V-shaped and channel-shaped strips during their advancement, and means for nesting the strips during their advancement, with one strip completely within the other.

2. In a machine for forming channels or the like, the combination with means for advancing and separately fashioning substantially V-shaped and channel-shaped strips, of means for nesting the strips during their advancement with the base of the V-shaped strip adjacent the base of the channel-shaped strip.

3. In a machine for forming channels or the like, the combination with means for separately fashioning a plurality of strips during their advancement, of means for nesting said strips with the bases thereof adjacent and securing said bases to each other during their advancement.

4. In a machine for forming channels or the like, the combination with rolls for advancing and fashioning a plurality of strips, of means for nesting the strips and securing the same to each other at longitudinally spaced points during their advancement.

5. In a machine for forming channels or the like, the combination with means for fashioning a plurality of strips during their advancement, of means for forming apertures in one of the strips during the advancement thereof, means for nesting the apertured strip within an outer strip during the advancement thereof, and means for striking-out securing portions in adjacent portions of the strips while nested and during their advancement.

6. In a machine for forming channels or the like, the combination with rolls for fashioning a plurality of strips during their advancement, of means for forming apertures in one of the strips during their advancement, means for nesting the apertured strip within an outer strip during their advancement, and means for striking-out securing portions in adjacent portions of the strips while nested and during their advancement to form openings registering with the apertures in the inner strip.

7. In a machine for forming channels or the like, the combination with means for advancing and fashioning a pair of strips, of means for forming apertures in one of the strips during their advancement, means for nesting the apertured strip within the other strip during their advancement, and intermittently driven means for striking-out securing tongues in adjacent portions of the two strips while nested and during their advancement to form openings registering with the apertures.

8. In a machine for forming channels or the like, the combination with means for advancing and fashioning a pair of strips, of means for forming apertures in one of the strips, means for nesting the apertured strip within the other strip, means for striking-out tongues in the adjacent portions of the two strips to form openings registering with the apertures, and means for crimping over said tongues.

9. In a machine for forming channels or the like, the combination with means for advancing and fashioning a pair of strips, of a mandrel for guiding the strips into nested relation, and means movable toward said mandrel for striking-out tongues in adjacent portions of the strips.

10. In a machine for forming channels or the like, the combination with means for advancing and fashioning a pair of strips, of means for nesting one strip within the other including a mandrel for guiding the strips, and means for securing the strips to each other including a shearing member for striking-out tongues in adjacent portions of the strips, said mandrel having provision for subsequently crimping said tongues.

11. In a window glass channel forming machine, the combination with pairs of co-operating rolls for advancing and fashioning a pair of strips to provide the same with bases, of a roll for forming apertures in one of said strips, a mandrel for guiding the strips into nested relation with the apertured strip within the other strip, a roll for striking-out tongues in the bases of the strips while guided by said mandrel, and means for controlling the operation of said last-mentioned roll to register the openings formed by striking-out the tongues with the first-mentioned apertures.

12. In a machine for forming channels or the like, the combination with means for fashioning a plurality of strips during their advancement, of means for effecting engagement of the strips during their advancement, and means for securing the engaging portions of the strips to each other controlled by their advancement.

13. In a machine for forming channels or the like, the combination with means for fashioning a plurality of strips during their advancement, of means for effecting engagement of the strips during their advancement, and means for striking-out projections in engaging portions of the strips during and controlled by the advancement of the strips.

14. In a machine for forming channels or the like, the combination with means for fashioning a plurality of strips, of means for nesting the strips, intermittently driven means for effecting the securing of adjacent portions of the nested strips during their advancement, and means actuated by one of the strips during its advancement for controlling said intermittently driven means.

15. In a machine for forming channels or the like, the combination with means for fashioning a pair of strips during their advancement, of means for forming apertures in one of the strips during the advancement thereof, means for effecting the engagement of the strips during their advancement, means for striking-out projections in adjacent portions of the strips during their advancement, and means actuated by the apertured strip during its advancement for controlling said striking-out means.

16. In a machine for forming channels or the like, the combination with means for advancing and fashioning a pair of strips, of means for forming apertures in one of the strips during the advancement thereof, means for nesting the apertured strip within the other strip during their advancement, intermittently driven means for striking-out securing tongues in adjacent portions of the two strips while nested and during their advancement, and means actuated by the apertured strip during its advancement to control said intermittently driven means whereby the latter will strike-out the securing tongues to form openings registering with the apertures in the apertured strip.

17. In a machine for forming channels or the like, the combination of means for guiding a plurality of nested strips, friction driven means for striking-out securing portions in adjacent portions of the nested strips, and means movable with the strips and actuated by one of the strips for controlling the operation of said driven means.

18. In a machine for forming channels or the like, the combination of a mandrel for guiding a plurality of nested fashioned strips during their advancement, a frictionally driven roll for striking-out securing portions in adjacent portions of the nested strips, means for normally holding said roll from rotation, and release means slidable longitudinally of said mandrel and controlled by one of the strips for actuating said roll holding means.

19. In a machine for forming channels or the like, the combination with a mandrel for guiding a plurality of nested fashioned strips, a roll provided with shearing projections engageable with adjacent portions of the strip for striking-out portions thereof, and means upon said mandrel and engageable with the struck-out portions of the strips for crimping the same.

20. In a window glass channel forming machine, the combination with a mandrel for guiding a pair of nested fashioned strips, the inner strip having longitudinally spaced notches in one of its edges, an intermittently driven roll provided with shearing projections engageable with adjacent portions of the strips, a member for normally holding said roll from rotation, and a release member slidably mounted upon said mandrel and provided with a projection engageable with the notches in the inner strip, said release member being adapted to actuate said roll holding member to release said roll.

21. In a window glass channel forming machine, the combination with a mandrel for guiding a pair of nested fashioned strips, the inner strip having longitudinally spaced notches in one of its edges, an intermittently driven roll provided with shearing projections engageable with adjacent portions of the strips, a member for normally holding said roll from rotation, a release member slidably mounted upon said mandrel and provided with a projection engageable with the notches in the inner strip, said release member being adapted to actuate said roll-holding member to release said roll, and means for disengaging the projection upon said release member from the notches in the inner strip.

22. In a machine for forming channels or the like, the combination with means for fashioning a plurality of strips during their advancement, of means for forming apertures in one of the strips during the advancement thereof, means for nesting the strips during advancement, and means for striking-out securing portions in adjacent portions of the strips while nested and during their advancement.

23. In a machine for forming channels or the like, the combination with means for fashioning a plurality of strips during their advancement, of means for forming apertures in one of the strips during their advancement, means for nesting the strips during advancement, and means for forming securing portions in adjacent portions of the nested strips during their advancement to form openings registering with the apertures of the apertured strip.

24. In a machine for forming channels or the like, the combination with means for fashioning a plurality of strips during their advancement, of means for nesting the strips during advancement, and means for striking-out securing portions in adjacent portions of the strips while nested and during their advancement.

25. In a machine for forming channels or the like, the combination with means for fashioning a plurality of strips during their advancement, of means for forming apertures in one of the strips during the advancement thereof, and means for nesting the strips and securing the strips to each other at points coincident with said apertures.

In testimony whereof I affix my signature.

HOMER G. KELLOGG.